United States Patent [19]
Murakami

[11] Patent Number: 6,102,739
[45] Date of Patent: *Aug. 15, 2000

[54] AUTOMATIC TRANSMISSION WIRING CONNECTOR

[75] Inventor: Yoshihiro Murakami, Shizuoka, Japan

[73] Assignee: Yazaki Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/903,687

[22] Filed: Jul. 31, 1997

[30] Foreign Application Priority Data

Jul. 31, 1996 [JP] Japan .................................... 8-202032

[51] Int. Cl.[7] .................................................. H01R 13/60
[52] U.S. Cl. ............................................. 439/587; 439/936
[58] Field of Search .................................... 439/492, 493, 439/499, 936, 587, 559

[56] References Cited

U.S. PATENT DOCUMENTS

| | | | |
|---|---|---|---|
| 4,448,474 | 5/1984 | Melnychenko | 439/493 |
| 4,492,421 | 1/1985 | Ito | 439/559 |
| 5,580,271 | 12/1996 | Buchheister, Jr. et al. | 439/493 |
| 5,637,007 | 6/1997 | Suzuki et al. | 439/276 |
| 5,700,161 | 12/1997 | Plummer et al. | 439/587 |

FOREIGN PATENT DOCUMENTS

| | | | |
|---|---|---|---|
| AS 14 15 657 | 11/1971 | Germany . | |
| 38 07 717 C2 | 8/1991 | Germany . | |
| 39 42 511 C1 | 1/1994 | Germany . | |
| 94 10 092 U1 | 9/1994 | Germany . | |
| 6-223903 | 8/1994 | Japan | H01R 9/16 |
| 7-201395 | 8/1995 | Japan | H01R 13/405 |
| 7-326424 | 12/1995 | Japan | H01R 13/52 |

*Primary Examiner*—Michael L. Gellner
*Assistant Examiner*—Briggitte R. Hammond
*Attorney, Agent, or Firm*—Sughrue, Mion, Zinn, Macpeak & Seas, PLLC

[57] ABSTRACT

An automatic transmission wiring connector is constituted by: a hollow housing provided with a male-terminal lead-out portion; a solubilized synthetic-resin member insertable into a rear-end opening portion; a relay terminal insert-molded together with the solubilized synthetic-resin member so that a male terminal portion is exposed in a hood portion through the male-terminal lead-out portion from a male-terminal insertion portion; and an electric wire fixed to a wire connection portion of the relay terminal exposed to the outside from the male-terminal insertion portion of the solubilized synthetic-resin member. Accordingly, the solubilized synthetic-resin member is heated and melted by the temperature of the injected resin for the insert molding to thereby seal the inside air-gap and the surroundings of the male terminal portion surely to increase the adhesion of the solubilized synthetic-resin member.

4 Claims, 3 Drawing Sheets

AUTOMATIC TRANSMISSION WIRING CONNECTOR

BACKGROUND OF THE INVENTION

The present invention relates to a wiring connector for preventing oil from leaking, which has penetrated through the inside of an electric wire introduced into an oil case of an automatic transmission or the like.

FIG. 3 shows a main part perspective view of a representative of a conventional automatic transmission wiring connector improved for preventing oil from leaking, through an air-gap in a conductor portion (wire harness) of an electric wire, from an oil case to the outside. Further, FIG. 4 shows a main part longitudinal sectional view thereof.

A conventional connector 10 attached to a through hole provided so as to penetrate the wall of an oil case of an automatic transmission (either of them is not shown) through an O-ring 21 fitted into a groove 20 cut in the outer circumferential surface of a housing body portion 16 thereof had a main part structure as follows.

That is, a main part of the conventional connector 10 was constituted by an inner plate 12 provided with a plurality of terminal lead-out holes 13 formed so as to penetrate the inner plate 12 so that the inner plate 12 is fitted into a hollow housing 11; a plurality of relay terminals 14 forced into the terminal lead-out holes 13 so that front end portions of the relay terminals 14 are extended and exposed in a hood portion 11a of the hollow housing 11 from the inner plate 12 along the axial direction of the hollow housing 11; a plurality of electric wires 19 the conductor portions of which are held by connection portions 15 of the relay terminals 14 so as to be in solderless-contact therewith; a rubber stopper member 17 provided with wire-lead-out through holes 18 corresponding to the relay terminals 14 fixed to the inner wall of the housing body portion 16, the rubber stopper member 17 being provided so as to be able to be fitted into a rear-end opening portion 23 of the hollow housing 11; and a synthetic-resin member 22 charged into the hollow housing 11 through the terminal lead-out holes 13 from the hood portion 11a side so as to seal the surroundings of the conductor portions of the electric wires 19 and the relay terminals 14.

However, the above-mentioned synthetic-resin member 22 charged into the hollow housing 11, such as epoxy resin, needs to be charged, several times repeatedly, around the relay terminals 14 arranged at a comparatively small distance from each other. In addition, the time taken for hardening the resin was long, and a trouble such as contacting with the air or the like occurred easily, so that the workability of charging was poor. In addition, it was easy to produce insufficient charging or adhesion failure of the synthetic-resin member 22 to the relay terminals 14. As a result, the disadvantage such as oil leakage was not solved perfectly.

Particularly, as is apparent from FIG. 3 showing the conventional connector in an exploded manner, it was necessary to carry out such a troublesome assembling working that after the front end portions of the electric wires 19 were inserted into the wire-lead-out through holes 18 of the rubber stopper member 17 in advance, the front end conductor portions of the electric wires 19 were held by the connection portions 15 of the relay terminals 14 so as to be in solderless-contact therewith, while the inner plate 12 was fitted from the hood portion 11a side into the relay terminals 14 which were inserted into the housing body portion 16 through the rear-end opening portion 23 so that the front end portions of the relay terminals 14 were fitted into the terminal lead-out holes 13.

On the other hand, an automatic transmission wiring connector constituted by relay terminals which were insert-molded so as to be buried in a connector housing is disclosed in Japanese Patent Unexamined Publication No. Hei 6-223903.

However, because of an extreme difference in linear expansion coefficient between the connector housing and each relay terminal, it was difficult to eliminate occurrence of adhesion failure between both the members.

SUMMARY OF THE INVENTION

It is an object of the present invention to solve the problems in the prior art as described above, and to provide an automatic transmission wiring connector having a comparatively compact structure by which oil leakage can be prevented effectively, the manufacturing cost can be reduced, and the assembling workability can be improved.

The foregoing object of the present invention is attained by a wiring connector to be fitted into a through hole provided in a case wall of an automatic transmission; characterized in that the automatic transmission wiring connector is constituted by: a hollow housing provided with a male-terminal lead-out portion along an axis inside a housing body portion of the hollow housing; a solubilized synthetic-resin member insertable into a rear-end opening portion of the hollow housing; a relay terminal insert-molded into the hollow housing together with the solubilized synthetic-resin member so that a male terminal portion of the relay terminal is exposed along the axial direction of the hollow housing in a hood portion of the hollow housing through the male-terminal lead-out portion from a male-terminal insertion portion provided in the solubilized synthetic-resin member; and an electric wire fixed to a wire connection portion of the relay terminal exposed to the outside from the male-terminal insertion portion of the solubilized synthetic-resin member; whereby the solubilized synthetic-resin member inserted into the rear-end opening portion is heated and melted by the temperature of the injected resin for the insert molding so as to seal the inside air-gap from the male-terminal insertion portion to the male-terminal lead-out portion.

Further, the object of the present invention is attained by the above automatic transmission wiring connector, further characterized in that the hollow housing has a wire-connection terminal support portion provided so as to project to divide the rear-end opening portion into upper and lower portions, and a cover member for covering and protecting the wire connection portion supported on the wire-connection terminal support portion.

Further, the object of the present invention is attained by the above automatic transmission wiring connector, further characterized in that the solubilized synthetic-resin member consists of solid epoxy resin material.

An automatic transmission wiring connector according to the present invention is a wiring connector to be fitted into a through hole provided in a case wall of an automatic transmission; characterized in that the automatic transmission wiring connector is constituted by: a hollow housing provided with a male-terminal lead-out portion along an axis inside a housing body portion of the hollow housing; a solubilized synthetic-resin member insertable into a rear-end opening portion of the hollow housing; a relay terminal insert-molded into the hollow housing together with the solubilized synthetic-resin member so that a male terminal portion of the relay terminal is exposed along the axial direction of the hollow housing in a hood portion of the hollow housing through the male-terminal lead-out portion from a male-terminal insertion portion provided in the solubilized synthetic-resin member; and an electric wire fixed to a wire connection portion of the relay terminal exposed to the outside from the male-terminal insertion portion of the solubilized synthetic-resin member. Accordingly, the solubilized synthetic-resin member inserted into the rear-end opening portion is heated and melted by the temperature of the injected resin for the insert molding to thereby seal the inside air-gap from the male-terminal insertion portion to the male-terminal lead-out portion surely, and to increase the adhesion of the solubilized synthetic-resin a member to the rear-end opening portion.

Further, a front-end conductor portion of the electric wire can be connected to the wire connection portion before installation in the site after such insert-molding, so that it is possible to relieve the troublesomeness in assembling working of the automatic transmission wiring connector.

Further, in the automatic transmission wiring connector according to the present invention, the hollow housing has a wire-connection terminal support portion provided to project so as to divide the rear-end opening portion into upper and lower portions, and a cover member supported on the wire-connection terminal support portion for covering and protecting the wire connection portion. Accordingly, the surroundings of the wire connection portion can be kept stable, and the surroundings of the wire connection portion exposed to the outside of the hollow housing can be protected easily only by fitting the cover member to the wire-connection terminal support portion.

Further, in the automatic transmission wiring connector according to the present invention, the solubilized synthetic-resin member consists of solid epoxy resin material, so that the temperature of the molding mold can be set higher than that of the temperature of the molding mold, and the insertion displacement due to melting in the initial stage of insertion to the mold can be prevented.

DETAILED DESCRIPTION OF THE INVENTION

An embodiment of an automatic transmission wiring connector according to the present invention will be described in detail below with reference to the accompanying drawings.

Figure 1:
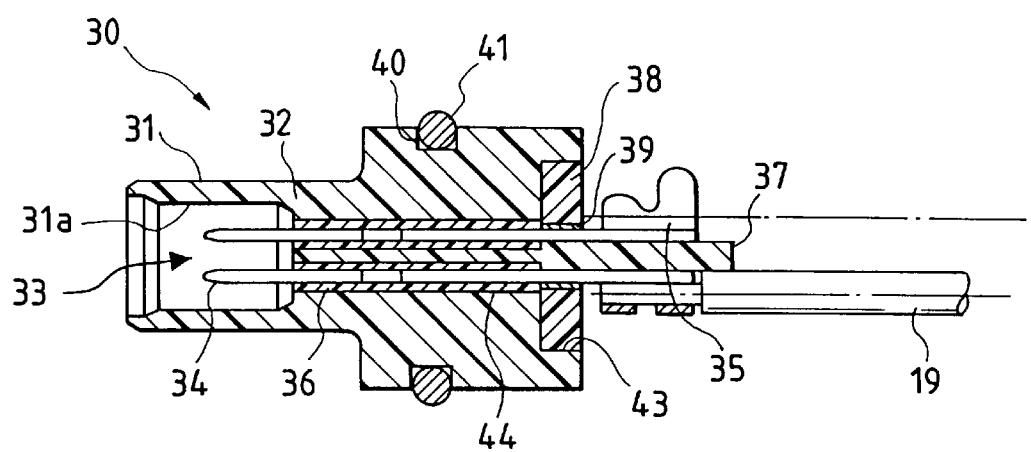
FIG. 1 is a longitudinal sectional view illustrating a main part of an automatic transmission wiring connector according to the present invention.
Figure 2:
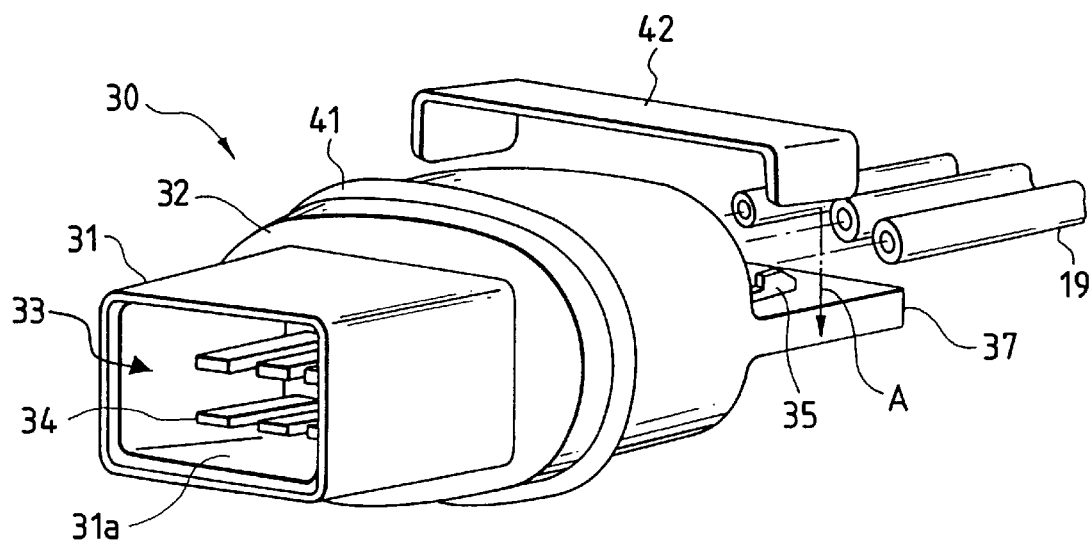
FIG. 2 is an exploded perspective view illustrating a main part of an automatic transmission wiring connector according to the present invention.
Figure 3:
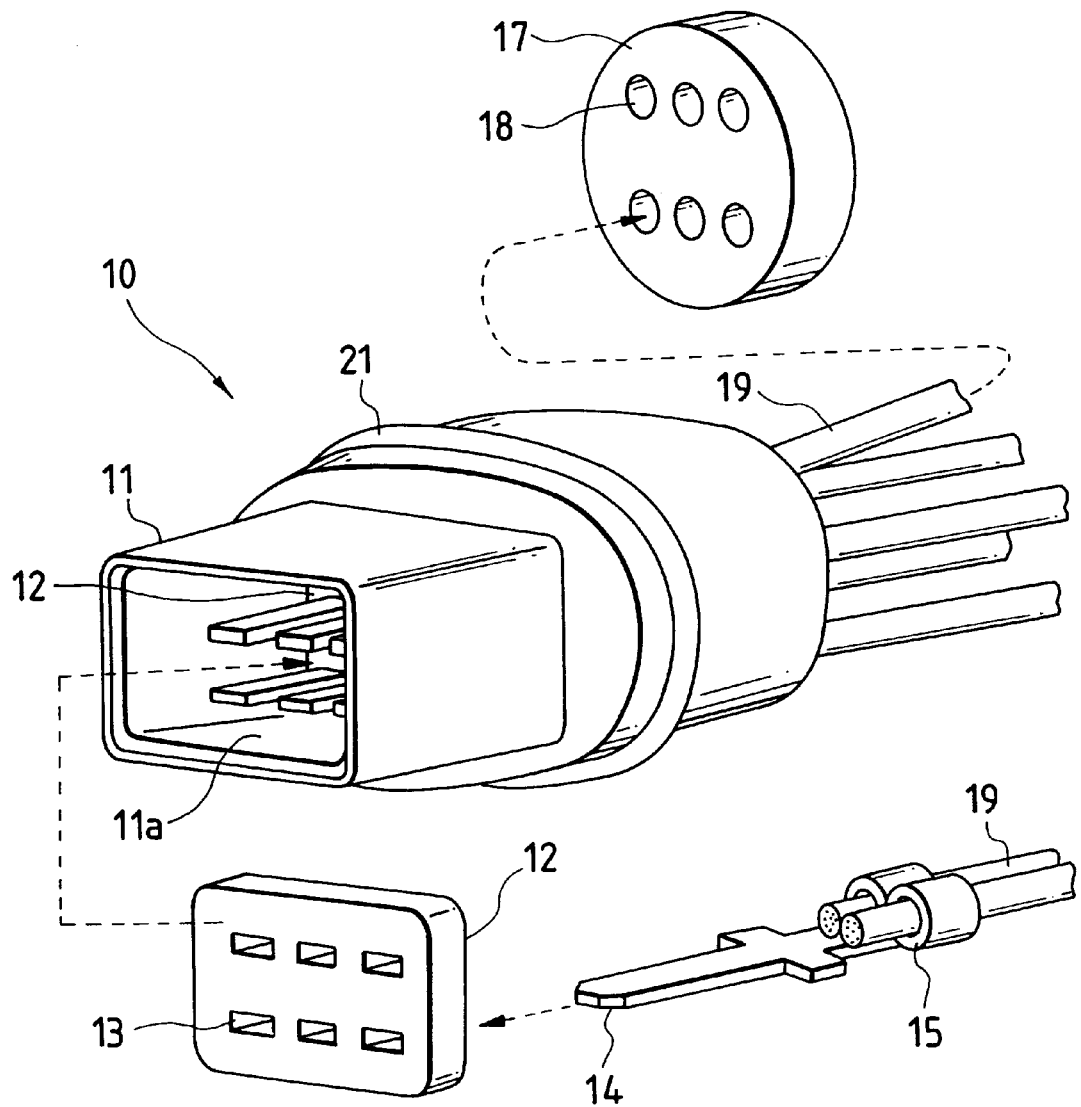
FIG. 3 is an exploded perspective view illustrating a main part of a conventional automatic transmission wiring connector.
Figure 4:
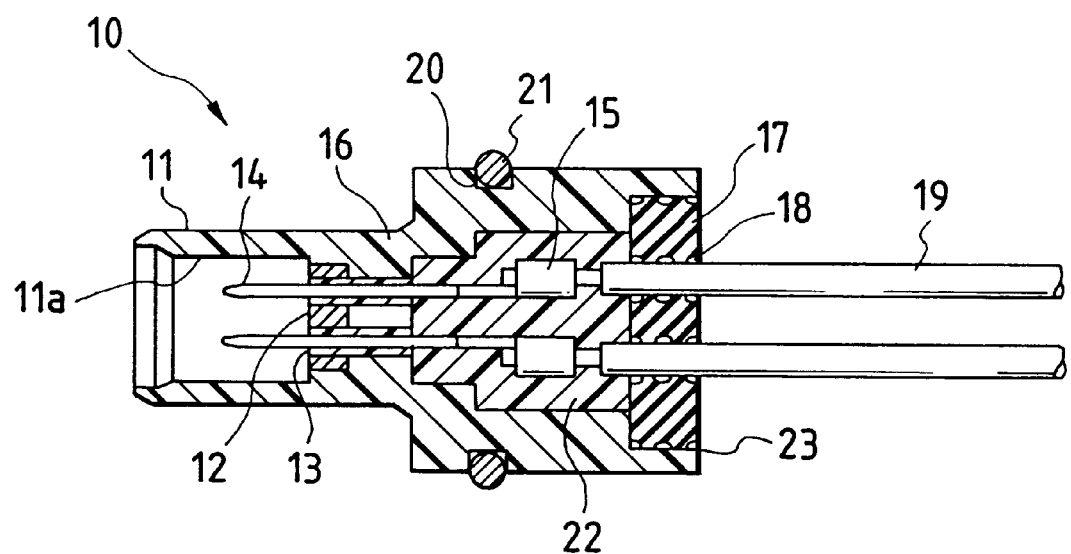
FIG. 4 is a longitudinal sectional view illustrating a main part of a conventional automatic transmission wiring connector.

An automatic transmission wiring connector 30 according to the present invention shown in FIG. 1 is fitted into a through hole (not-shown) provided through a wall (not-shown) of an oil case of an automatic transmission. Most of a male terminal portion 34 of a relay terminal 33 is received in the inside of a housing body portion 32 of a hollow portion 31 having a male-terminal lead-out portion 36 which is formed along the axis.

A hood portion 31a for covering and protecting the connection portion to a mating female terminal is formed in a front-end opening portion of the hollow housing 31. On the other hand, a solubilized synthetic-resin member 38 is inserted into a rear-end opening portion 43 of the hollow housing 31 by insert-molding together with the male terminal portion 34 of the relay terminal 33.

The temperature of a mold for molding resin material, for example, consisting of glass-fiber filler containing nylon 6—6, for producing the hollow housing 31, is usually set to be about 80° C. Accordingly, if, for example, solid epoxy resin is selected for the solubilized synthetic-resin member 38 inserted into the molding mold, higher melt temperature (for example, 150° C. or more) than the above-mentioned set temperature of the molding mold is given to the synthetic-resin member 38 so as to prevent generation of the insert displacement due to melting in the initial stage of insertion.

The relay terminal 33 constituting a portion of the automatic transmission wiring connector 30 of the present invention, is insert-molded into the hollow housing 31 together with the solubilized synthetic-resin member 38 so that the male terminal portion 34 is exposed along the axial direction of the hollow housing 31 in the hood portion 31a through the male-terminal lead-out portion 36 from a male-terminal insertion portion 39 provided through the solubilized synthetic-resin member 38. On the other hand, the wire connection portion 35 is exposed to the outside from the male-terminal insertion portion 39 of the solubilized synthetic-resin member 38. Therefore, a front-end conductor portion of an electric wire 19 may be made into solderless-contact with the wire connection portion 35 before wiring in the site.

In order to keep the surroundings of the wire connection portion 35 stable after the front end conductor portion of the electric wire is made into solderless-contact with the wire connection portion 35 of the relay terminal 33 exposed to the outside from the male-terminal insertion portion 39 of the solubilized synthetic-resin member 38, it is preferable to provide with a wire-connection terminal support portion 37 so as to project to divide the rear-end opening portion 43 of the hollow housing 31 into upper and lower portions.

Further, preferably, a cover member 42 for covering and protecting the wire-connection portion 35 supported on the wire-connection terminal support portion 37 and the front-end conductor portion of the electric wire 19 is fitted to the wire-connection terminal support portion 37 in the direction of arrow A from above the wire connection portion 35. The cover member 42 may be fitted from the lower side or both the upper side and the lower side of the wire-connection terminal support portion 37 in accordance with necessity.

The automatic transmission wiring connector 30 according to the present invention has another feature that in the solubilized synthetic-resin member 38 inserted into the rear-end opening portion 43 of the hollow housing 31 inside the molding mold, as mentioned above, the surface contacting with molding resin material of the hollow housing 31 is melted gradually with the injection of the molding resin material usually heated to about 250° C. or more, an inside air-gap 44 of the housing body portion 32 from the male-terminal insertion portion 39 to the male-terminal lead-out portion 36 is filled with a portion of the solubilized synthetic-resin member 38 heated and melted, and thereafter the solubilized synthetic-resin member 38 is solidified again to seal the surroundings of the male terminal portion 34 of the relay terminal 33 perfectly and to increase the adhesion of the solubilized synthetic-resin member 38 to the rear-end opening portion 43.

The thus configured automatic transmission wiring connector 30 according to the present invention has novel effects as follows. That is, the automatic transmission wiring connector 30 according to the present invention is fitted into a through hole provided through a wall of an oil case of an automatic transmission and is constituted by: a hollow housing 31 provided with a male-terminal lead-out portion 36 along an axis inside a housing body portion 32 of the hollow housing; a solubilized synthetic-resin member 38 insertable into a rear-end opening portion 43 of the hollow housing 31; a relay terminal 33 insert-molded into the hollow housing 31 together with the solubilized synthetic-resin member 38 so that a male terminal portion 34 of the relay terminal 33 is exposed along the axial direction of the hollow housing 31 in a hood portion 31a of the hollow housing 31 through the male-terminal lead-out portion 36 from a male-terminal insertion portion 39 provided in the solubilized synthetic-resin member 38; and an electric wire 19 fixed to a wire connection portion 35 of the relay terminal 33 exposed to the outside from the male-terminal insertion portion 39 of the solubilized synthetic-resin member 38. Accordingly, the solubilized synthetic-resin member 38 inserted into the rear-end opening portion 43 is heated and melted by the temperature of the injected resin for the insert molding to thereby seal the inside air-gap 44 from the male-terminal insertion portion 39 to the male-terminal lead-out portion 36 and the surroundings of the male terminal portion 34 of the relay terminal 33 surely, and to increase the adhesion of the solubilized synthetic-resin member 38 to the rear-end opening portion 43.

Further, a front-end conductor portion of the electric wire 19 can be made into solderless-contact with the wire connection terminal portion 35 before installation in the site after such insert-molding, so that it is possible to eliminate troublesomeness in the assembling working of the automatic transmission wiring connector 30.

Further, in the automatic transmission wiring connector 30 according to the present invention, the hollow housing 31 has the wire-connection terminal support portion 37 provided to project so as to divide the rear-end opening portion 43 into upper and lower portions, and the cover member 42 for covering and protecting the wire connection portion 35 supported on the wire-connection terminal support portion 37. Accordingly, the surroundings of the wire connection portion 35 can be kept stable, and the surroundings of the wire connection portion 35 exposed to the outside of the hollow housing 31 can be protected easily only by fitting the cover member 42 to the wire-connection terminal support portion 37.

Further, in the automatic transmission wiring connector 30 according to the present invention, the solubilized synthetic-resin member 38 consists of solid epoxy resin material. Accordingly, the melting temperature of the resin member 38 can be set higher than the temperature of the molding mold, and an insertion displacement due to melting of the resin material in the initial stage of insertion to the mold can be prevented.

What is claimed is:

1. An automatic transmission wiring connector to be fitted into a through hole provided in a case wall of an automatic transmission, comprising:

a hollow housing provided with a male-terminal lead-out portion along an axis inside a housing body portion of said hollow housing;

a solubilized synthetic-resin member insertable into a rear-end opening portion of said hollow housing;

a relay terminal insert-molded into said hollow housing together with said solubilized synthetic-resin member so that a male terminal portion of said relay terminal is exposed along the axial direction of said hollow housing in a hood portion of said housing through said male-terminal lead-out portion from a male-terminal insertion portion provided in said solubilized synthetic-resin member; and an electric wire fixed to a wire connection portion of said relay terminal exposed to the outside from said male-terminal insertion portion of said solubilized synthetic-resin member, so that said wire connection portion is exposed to the outside of said hollow housing;

wherein said solubilized synthetic-resin member inserted into said rear-end opening portion is heated and melted by a temperature of an injected resin of said insert molding so as to seal an inside air-gap from said male-terminal insertion portion to said male-terminal lead-out portion.

2. An automatic transmission wiring connector according to claim 1, wherein said hollow housing includes a wire-connection terminal support portion provided so as to project to divide said rear-end opening portion into upper and lower portions, and a cover member for covering and protecting said wire connection portion supported on said wire-connection terminal support portion.

3. An automatic transmission wiring connector according to claim 1, wherein said solubilized synthetic-resin member is made of solid epoxy resin material.

4. An automatic transmission wiring connector according to claim 1, wherein a portion of said solubilized synthetic-resin member gradually melts upon contact with said injected resin and resolidifies so as to adhere to said rear-end opening portion.

* * * * *